United States Patent [19]

Garcia, II

[11] Patent Number: 4,823,249
[45] Date of Patent: Apr. 18, 1989

[54] HIGH-FREQUENCY RESONANT POWER CONVERTER

[75] Inventor: John D. Garcia, II, Greenville, Tex.

[73] Assignee: American Telephone and Telegraph Company AT&T Bell Laboratories, Murray Hill, N.J.

[21] Appl. No.: 43,008

[22] Filed: Apr. 27, 1987

[51] Int. Cl.$^4$ ............................................. H02M 1/14
[52] U.S. Cl. ........................................ 363/48; 363/24; 363/126; 363/134
[58] Field of Search .................... 363/17, 22, 23, 24, 363/25, 26, 47, 48, 98, 126, 133, 134, 16

[56] References Cited

U.S. PATENT DOCUMENTS

| | | | |
|---|---|---|---|
| 3,089,077 | 5/1963 | Lee | 363/134 X |
| 4,415,959 | 11/1983 | Vinciarelli | 363/21 |
| 4,628,426 | 12/1986 | Steigerwald | 363/134 X |
| 4,685,041 | 8/1987 | Bowman et al. | 363/126 X |
| 4,720,667 | 1/1988 | Lee et al. | 323/271 |
| 4,720,668 | 1/1988 | Lee et al. | 323/271 |

FOREIGN PATENT DOCUMENTS 0046874  3/1983  Japan ..................................... 363/25

OTHER PUBLICATIONS

"Two-Megahertz Off-Line Hybridized Quasi-Resonant Converter", by D. C. Hopkins, M. M. Jovanovic, F. C. Lee and F. W. Stephenson, *IEEE Applied Power Electronics Conference* (San Diego) 1987 Mar. 2-6, pp. 105-114.

"Low-Profile High-Frequency Off-Line Quasi-Resonant Converter", by Albert M. Heyman, *IEEE Applied Power Electronics Conference* (San Diego) 1987 Mar. 2-6, pp. 157-165.

"Practical Resonant Power Converters-Theory and Application", Part II-The Resonant Switch Concept, by P. C. Todd and R. W. Lutz, *Power Technics Magazine*, May 1986, pp. 29-35.

"Secondary-Side Resonance For High-Frequency Power Conversion", by K. Liu and F. C. Lee, *IEEE Applied Power Electronics Conference*, (New Orleans) Apr. 28-May 1, 1986, pp. 83-89.

Primary Examiner—Patrick R. Salce
Assistant Examiner—Kristine Peckman
Attorney, Agent, or Firm—Alfred G. Steinmetz

[57] ABSTRACT

A high frequency DC to DC converter having at least two phase differentiated pulsed voltage sources, utilizes two phase differentiated unidirectional power flow resonant circuits to permit multiple quasi resonant operation of the converter and thereby gain the benefit of lowered EMI, high efficiency, lowered component stress and increased power throughput.

9 Claims, 5 Drawing Sheets

HIGH-FREQUENCY RESONANT POWER CONVERTER

FIELD OF THE INVENTION

This invention relates to high frequency power converters with resonant power throughput.

BACKGROUND OF THE INVENTION

A common disadvantage of many types of existing power converters with single mode resonant power throughput is the disproportionate voltage and current stress placed on the power train components relative to the level of power throughput. Further disadvantages of existing resonant power converters include limitation to a single switching device (i.e. single ended converters) and limitations on the duty cycle range of the power switch. These single ended converters have a unidirectional flux excursion in the power transformer and hence need the added complexity of a core reset circuit. One such single ended resonant zero current switching power converter having a unidirectional flux excursion in the power transformer is disclosed in U.S. Pat. No. 4,415,959. It therefore requires a commutation switch in order to reset the transformer core and to provide continuous power to the load. It also has the aforementioned disadvantage of limited duty cycle operation in order to prevent internal power circulation and to assure power throughput. This limited duty cycle further causes the peak voltage stress on the power switch, rectifying diodes and resonating capacitor to be excessively large compared to the power being processed.

Power converters such as disclosed by F. C. Lee et al in APEC 86, pages 84–89 in an article entitled "Secondary-side Resonance for High Frequency Power Conversion" are double ended and have a bidirectional resonant path permitting bidirectional flux excursions and hence eliminate a need for a core reset circuit. A particular example described therein employs a resonating capacitor which is shunted directly across the secondary winding. Such an arrangement however still operates with a single mode resonance and places high stress on the power train components. In addition the power circuit disclosed has a tendency to circulate energy in the resonant circuit thereby blocking energy flow to the output if the duty cycle of the power switch is too large (i.e., greater than 50%) or if operated at very light load.

It is apparent that the above described prior art exemplary converters operate in single mode resonance and place a high stress on power train components. Attainable power levels for given component capacities is therefore limited. A tendency to circulate energy within a converter tank circuit at certain duty cycles is a further limit on the versatility of these prior art converters.

BRIEF DESCRIPTION OF THE INVENTION

A high frequency DC to DC converter having at least two phase differentiated pulsed voltage sources, utilized two phase differentiated unidirectional power flow resonant circuits to permit multiple quasi resonant operation of the converter and thereby gain the benefit of lowered EMI, high efficiency, lowered component stress and increased power throughput. A particular embodiment is realized through a double ended push pull power converter in which a resonating capacitor is added subsequent to the rectifier diodes but prior to the output filter circuit. Parasitic capacitance of the diodes and leakage inductance of the power transformer is used as part of two oppositely phased resonant circuits in which each resonant circuit is responsive to a voltage pulse of an associated power switch of the push pull converters. Power flow in each resonant circuit is unidirectional and the single resonant capacitor shared by the two resonant circuits is chosen relative to the impedance of a subsequent filter circuit so that only the dc component of its voltage is transmitted to the load.

The power converter circuit embodying the invention may as shown (but is not limited to) operate in a frequency modulation mode, in which a cyclic interval is varied with a fixed pulse width predetermined for either on or off conditions of the power switch, with a zero current switching condition achieved. Duty cycles above 50% are permitted without impairing energy throughput. Other specific implementations of power converters which may embody these principles include half bridge and full bridge inverters.

DETAILED DESCRIPTION

Figure 1:
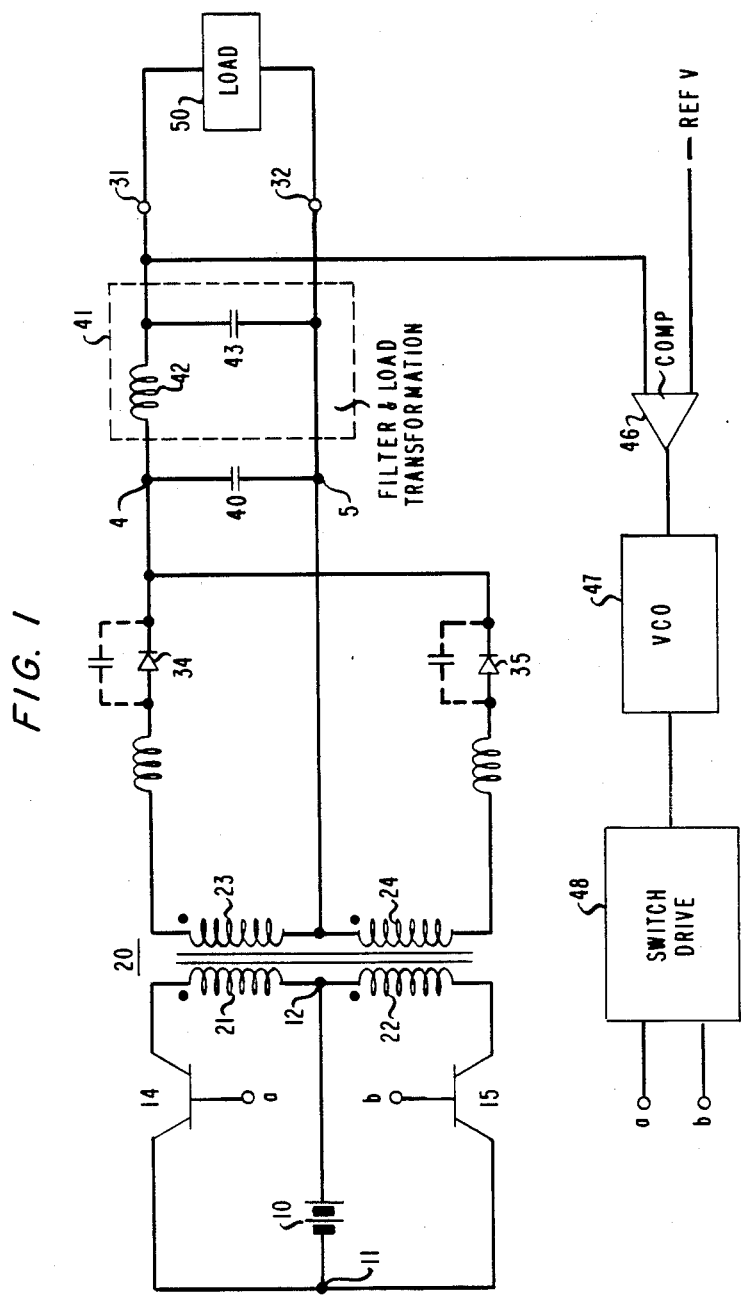
FIG. 1 is a circuit schematic of a regulated quasi resonant double ended DC to DC converter operating in a fixed pulse, variable interval mode of operation and embodying the principles of the invention.

A push pull or double ended DC to DC converter adopted to operate in a quasi resonant mode is shown in FIG. 1. A DC voltage source 10 connected to the input terminals 11 and 12 is alternately applied to the primary windings 21 and 22 of power transformer 20 through the alternate ON-OFF switching of power transistors 14 and 15, respectively. The secondary windings 23 and 24 are coupled through rectifying diodes 34 and 35 to terminal 4 of a resonating capacitor 40 respectively which is in turn connected across the output filter and load transformation network 41 which is shown as comprising inductor 42 and capacitor 43. A load 50 to be energized is connected to output terminals 31 and 32 so as to shunt filter capacitor 43.

A control circuit for voltage regulation is shown which operates the switching of the two power switching transistors 14 and 15 in a variable frequency mode of operation. A replica of the output voltage sensed at output terminal 31 is coupled to a comparaor 46 which is also connected to receive a reference voltage. The output error signal of the comparator 46 is applied to a duty cycle control 47 which may comprise a voltage controlled oscillator whose frequency is responsive to the magnitude of the error signal. The duty cycle control output is applied to a switch drive circuit 48 which may comprise a monostable multivibrator in which one output is fixed in duration while the other output varies in duration in order to accomplish regulation of the output voltage. The multivibrator output is applied through a toggle gate which alternates the drive to the a and b terminals and hence to the base inputs a and b of the two switching transistors 14 and 15. While bipolar transistors are shown it is to be understood that power MOSFETS may be used with drive applied to the gate terminals.

The power transformer 20 is preferably designed to have the leakage reactances 38 and 39, which appear most prominently on the secondary windings 23 and 24, and which are designed to be an integral part of the resonant circuitry of converter. Discrete inductances, if needed, may be used in place of or to supplement this leakage inductance. Each of the rectifying diodes 34 and 35 include the parasitic capacitances 36 and 37 which also are an integral part of the resonant converter operation. These two capacitive elements may also be supplemented or replaced by discrete capacitors if needed.

Each rectifying diode 34 and 35 is connected to terminal 4 of a resonating capacitor 40 whose capacitance is selected so that each series connection of a leakage inductance, parasitic capacitance and resonating capacitor resonates in response to a voltage pulse drive supplied by an associated one of the switching transistors 14 and 15. The other oppositely phased resonant circuit not being driven at that time operates in a filter mode to reduce harmonics applied to the resonating capacitor 40 and to the output. The output filter 41 is designed to have an input impedance substantially exceeding the impedance of the resonant circuit driving it and hence transmits only the DC voltage of the resonating capacitor to the output load 50. While filter 41 is shown as a single stage filter, multi stage filters with similar characteristics may also be used.

This circuit and its many advantages may be readily understood by describing a typical cycle of steady state operation. The converter circuit basically operates in a two phase mode of resonant operation in which a separate quasi resonant signal processing event is independently associated with each switching transistor 14 and 15. A current flow in either one of the switching transistors 14 and 15 causes a current to flow in its associated quasi resonant circuit. The current flow in the resonant circuit, resonates by charging the resonating capacitor 40 first in one direction and then by continued resonant action discharges the resonating capacitor 40 in the opposite direction. During the resonant interval output load current is supplied through the rectifying diodes 34 and 35. When the conducting switching transistor turns off the resonating capacitor finally discharges into the load. Circuit continuity during the simultaneous nonconduction of the switching transducers 14 and 15 is provided by the simultaneous forward conduction action of the rectifying diode 35 and 34 respectively. This sequence of operation is followed in each individual half phase of operation of the push pull circuit, with each oppositely phased quasi resonant circuit operating alternately and independently with respect to one another.

Figure 4:
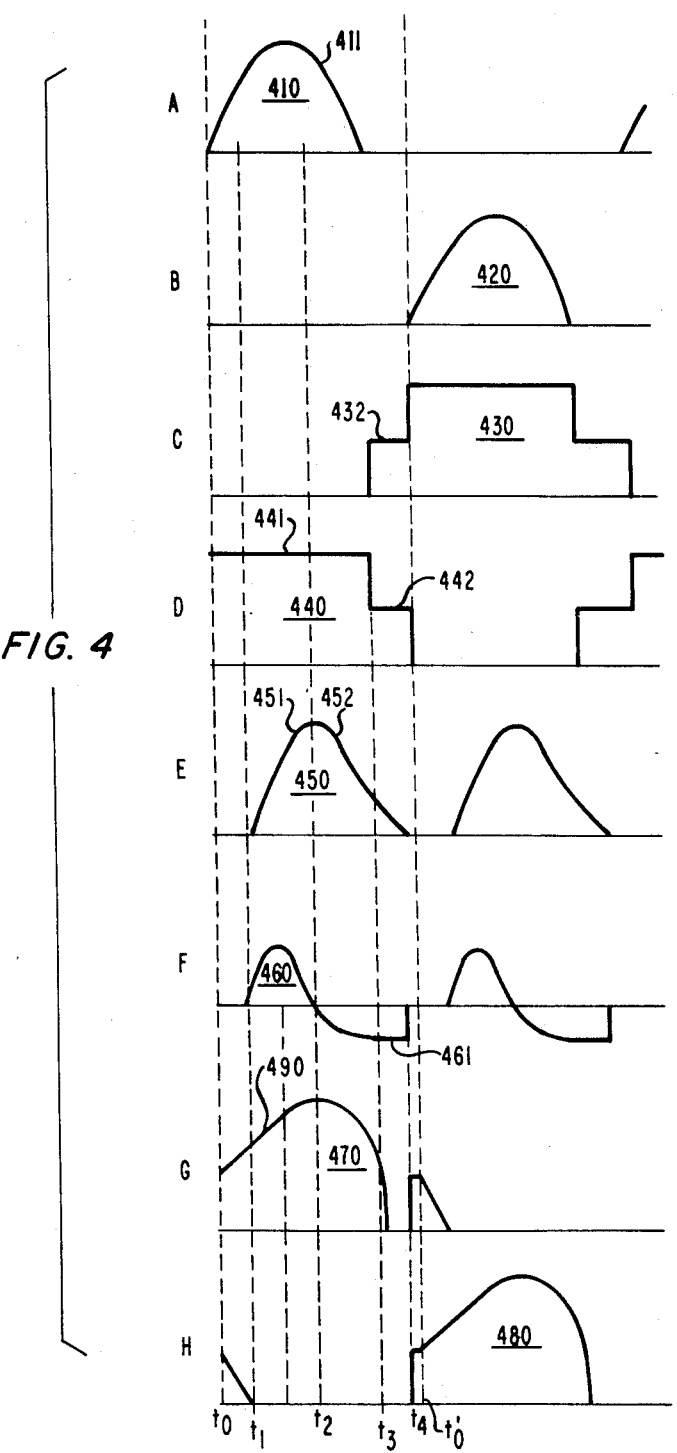
FIG. 4 discloses current and voltage waveforms useful in explaining the operation of the converter circuit disclosed in FIG. 1.

The principles of the circuit are readily ascertained by referring to the various voltage and current waveforms of FIG. 4 occurring during steady state operation of the converter. Prior to the initial time $T_0$ shown in FIG. 4 both switching transistors 14 and 15 are biased nonconducting and a continuity maintenance current drawn by filter inductor 42 is flowing through both rectifying diodes 34 and 35. Each diode 34 and 35 carries a current magnitude equal to half the output load current.

For the purpose of exploring circuit operation, assume that at time $t_0$ as shown in FIG. 4, the transistor 14 has just been biased into a conducting state and that transistor 15 has been nonconducting for a short interval starting prior to $t_0$ and for the time being remains nonconducting. A current shown by current waveform 410 in FIG. 4, part A begins to flow in the circuit loop comprising the voltage source 10, transformer winding 21 and the switching transistor 14. At this moment there is no current flow in the circuit loop including transistor 15 and hence a voltage equal in magnitude to twice the voltage of voltage source 10 appears across the transistor 15 as shown by voltage level 441 of voltage waveform 440 in FIG. 4, Part D.

The current flowing through transistor 14 has a sinusoidal wave form and continues conducting in duration sufficiently to complete a full half cycle current waveform for which eventually terminates at $t_3$. This is shown in current waveform in FIG. 4, part A which extends from $t_0$ to $t_3$. A current shown by waveform 470 in FIG. 4, part 6 is flowing through the rectifying diode 35 and at the time $t_0$ has a value equal to $\frac{1}{2}$ the output load circuit. It steadily increases in value as shown by waveform 470 in FIG. 4, Part G of a value equaling the load current at time $t_1$ and eventually to a peak value at time $T_2$. All the current exceeding the load current is directed into the resonating capacitor 40 as shown by waveform 460 in FIG. 4, Part F. Rectifying diode 34 also conducts a current equaling $\frac{1}{2}$ the load circuit at time $t_0$ as shown by waveform 480 in FIG. 4, Part H. This current is decaying and reaches zero value at time $t_1$. Since the output filter inductor 42 acts as a constant current sink only a current equal to the steady state load current is transmitted into the load 50 and any excess current is directed into the resonating capacitor 40. This charging current is shown by waveform 460 in FIG. 4, Part F, and is shown extending between times $t_1$ and $t_4$. It completes a $\frac{3}{4}$ period sine wave function at time $t_3$ which is followed by a fixed charging current which abruptly terminaters at $t_4$.

At time $t_1$ the current in the switching transistor 14 and in the associated conducting rectifying diode 35 is at a value substantially equal to the full load current, as shown in waveform 470 in FIG. 4, Part G, ramp 490. The current in diode 34, as shown by waveform 480 in FIG. 4, Part H has decayed to zero by time $t_1$ leaving diode 34 fully reverse biased and nonconducting. After time $t_1$ a charging current continues to increase in both transistor 14 and diode 35 as shown by waveform 460 in FIG. 4, Part F begins to flow into the resonating capacitor 40 causing its voltage to rise along curve 451 as shown by waveform 450 in FIG. 4, Part E.

During the time interval from $t_1$ to $t_3$ the current in conducting transistor 14 rises to its peak value at time $t_2$ as shown by point 411 and the capacitor 40 is also charged to its peak value at this same time $t_2$ as shown by point 452 in waveform 450. This transistor current subsequently declines to zero at time $t_3$, and immediately subsequent to this time $t_3$, the charging current flowing through capacitor 40 goes negative and declines to a negative value equaling the load current magnitude at time $t_4$ as shown by waveform 460 in FIG. 4, Part F.

At time $t_3$ the transistor 14 is biased nonconducting and current flow in its related circuit loop shown by waveform 410 ceases. Similarly, current flow in the rectifying diode 35 shown by waveform 470 has also dropped to zero. The charging current in the resonating capacitor 40 stabilizes at the negative value of the load circuit as shown by level 461 in waveform 460 shown in FIG. 4, Part F. At the time $t_4$ the rectifying diodes 34 and 35 are both individually conducting a current equaling half the load current thereby providing a flyback current path to provide the continuous load current to the filter inductor 42. The current flow in the resonating capacitor 40 drops abruptly to zero at the end of the half cycle as shown by waveform 460 and the voltage drop across each transistor 14 and 15 is equal to the input voltage as shown by voltage levels 432 and 442 in FIG. 4, Parts C and D respectively.

At the end of the half cycle neither switching transistor 14 or 15 is at the moment $t_0$ conducting. The voltage drop across each transistor is equal to the input voltage as shown by voltage level 432 and 442 in FIG. 4, Parts C and D respectively. At $t_0^1$ the switching transistor 15 begins to conduct current in agreement with the waveform 420 in FIG. 4, Part B and the second half cycle is initiated which proceeds in a manner similar to that described for the first half cycle.

It is apparent from the foregoing description that the quasi resonant signal action is advantageously confined to the secondary part of the converter circuit and that since each half cycle is sufficient in duration to permit the desired resonant action, the variable pulse width conduction interval on the primary side may be operated over a considerable range without adversely affecting the resonant properties of the circuit. A particular feature of this arrangement is the parasitic capacitance of the rectifying diode that shunts the rectifying diode and the leakage inductance associated with the idle resonant circuit which in any half cycle functions as a harmonic filter and limits the application of harmonics to the resonating capacitor 40.

Figure 2:
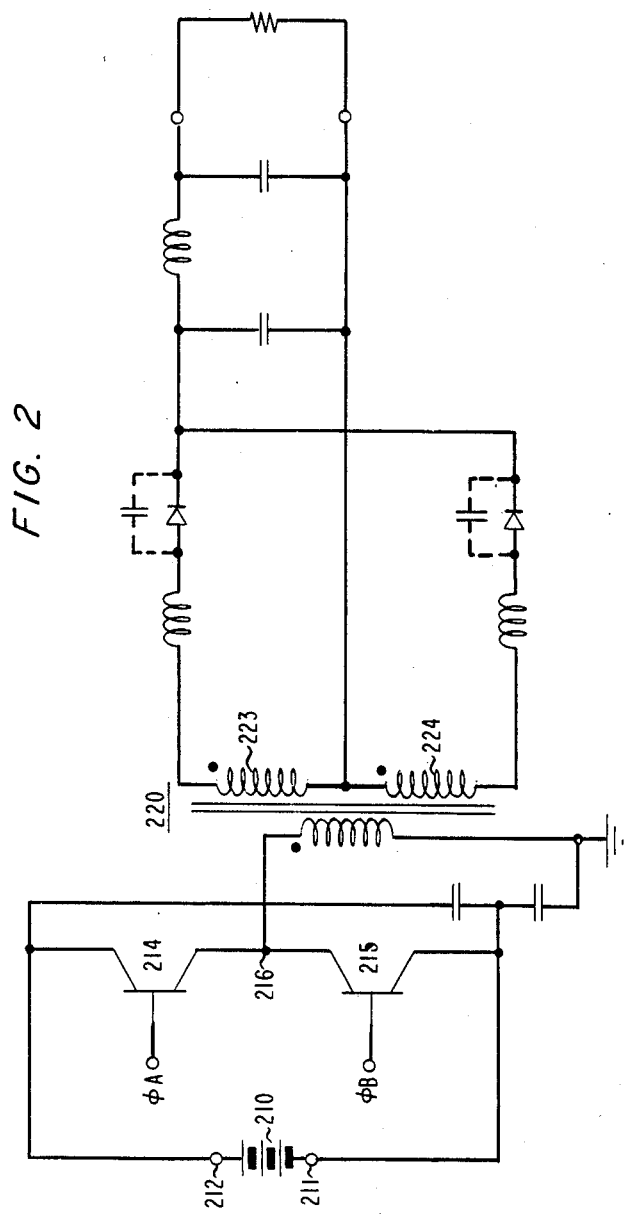
FIG. 2 is a circuit schematic power train of a quasi resonant half bridge DC to DC converter embodying the principles of the invention.

A half bridge embodiment of a power train embodying the principles of the invention is shown in a schematic form in FIG. 2 in which two alternately conducting transistor switches 214 and 215 are shown connected in series connection with this series connection being connected in shunt with the DC voltage source 210 and the input voltage terminals 211 and 212. The switched output voltage is taken from the junction node 216 of the two switching transistors 214 and 215 and is applied to the primary winding 221 of transformer 220. A resonant secondary circuit identical to the FIG. 1 is alternately energized by secondary windings 223 and 224. The operation of half bridge inverters is well known to those skilled in the art, and hence its operation need not be discussed in detail.

Figure 3:
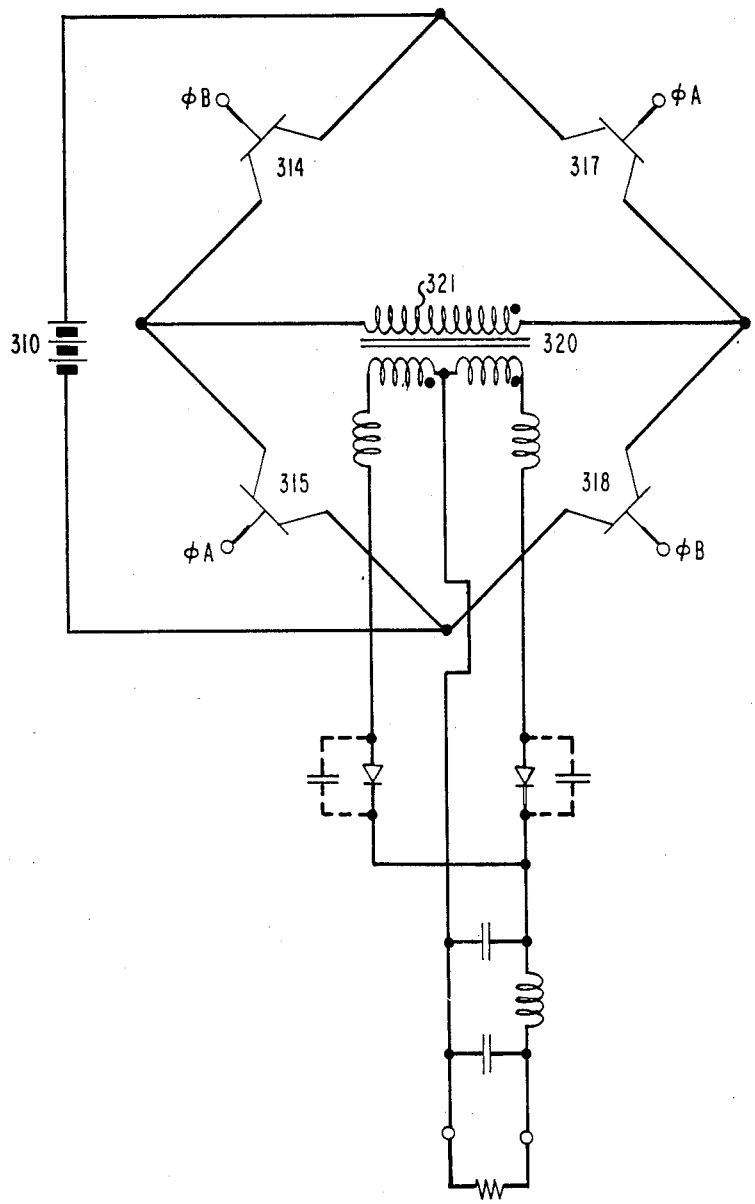
FIG. 3 is a circuit schematic of a power train of a quasi resonant full bridge DC to DC converter embodying the principles of the invention.

A full bridge embodiment of the inverter is shown in FIG. 3 which includes four switching transistors 314, 315, 317 and 318 in which two opposing switches are operated in phase with one another to apply alternately directed energy pulses to the primary winding 321 of transformer 320. The secondary portion of the circuit is substantially identical in circuitry and operation to that shown for FIG. 1.

Figure 5:
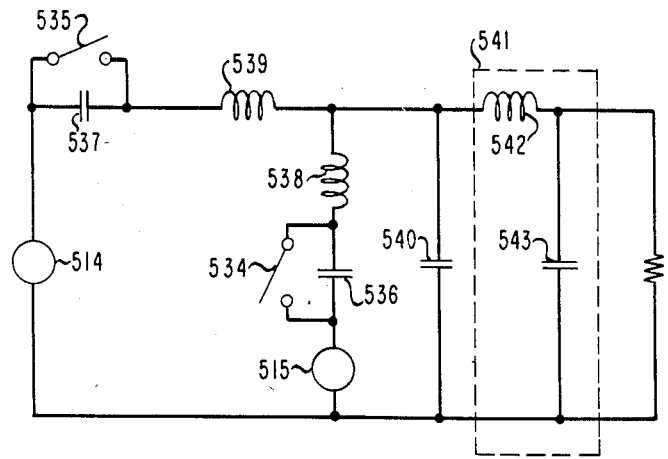
FIG. 5 is an equivalent circuit useful in describing the operation of the circuit disclosed in FIG. 1.

An equivalent circuit showing the electrical funtional operation of the circuit schematic of FIG. 1 is shown in FIG. 5. The power transformer is not shown and hence a unity transformation ratio is assumed. The two oppositely phased resonant circuits are shown as having oppositely phased voltage pulse source circuits 514 and 515 coupled to them. The first resonant circuit coupled to voltage pulse source 514 includes a switch 535 which is operated as a diode switch, a capacitance 537 shunting the switch and an inductance 539. The second resonant circuit coupled to voltage pulse source 515 includes the diode switch 534, a capacitance 536 shunting the switch and an inductance 538.

The two pulse voltage sources are operated during oppositely phased intervals as that the two oppositely phased resonant circuits are pulsed or pumped alternately during oppositely phased intervals. Each resonant circuit shares a common resonant capacitor 540 which is connected at the input to the output filter 541 which includes inductor 542 and capacitor 543. As each resonant circuit is pulsed, the inductor of that circuit resonates within resonant capacitor 540 for substantially a half cycle of operation with subsequent resonance being cut off by the opening of the associated/switch diode. The inductor and capacitor of the nonresonating circuit in the opposite phase operates as a harmonic filter to reduce harmonics being applied to the resonating capacitor 540. Operation of the circuit at FIG. 5 may be further specified in terms of the following equations specifying the response and conditions of operation of the resonant circuits.

$$V_{CR}(t) = V_{CR}(t_1) \left[ \frac{I_{CR}(t) \Delta t}{C_R} \right] \quad (1)$$

$$I_{CR}(t) = I_{CR}(t-1) - \left[ \frac{[V_{LR}(t-1) - V_{OUT}(t)]C_R}{\Delta t} \right] \quad (2)$$

$$I_{LR}(t) = I_{LR}(t-1) + \left[ \frac{[V_{max} - V_{CR}(t-1)]\Delta t}{L_1} \right] \quad (3)$$

$$V_{LR}(t) = V_{LR}(t-1) - \left[ \frac{[I_{LR}(t) - I_{LR}(t-1)]L_1}{\Delta t} \right] \quad (4)$$

$$\left( \frac{V_{MAX}}{Z_{TON(LC)}} \right) > I_{load} > I_{critical} > \frac{V_{Max} t_{OFFmax}}{L_{matching}} \quad (5)$$

where
$C_R$ is the capacitance of the resonating capacitor 540.
$V_{MAX}$ is the maximum voltage applied by the source (514) to the resonant network.
$L_{matching}$ is the inductance of output filter 41.
$V_{CR}$ is the voltage across the resonating capacitor $C_R$ 540.
$I_{CR}$ is the current through the resonating capacitor $C_R$ 540.
$L_R$ is the leakage reactance 539 or 538 forming part of each resonant
$V_{LR}$ is the voltage across the leakage rectance $L_R$, 538 or 539.
$I_{LR}$ is the current through the leakage rectance $L_R$, 538 or 539.

$$Z_{TON(LC)} \text{ is defined as equal to } \frac{\sqrt{\frac{L_R}{C_R}}}{2}$$

What is claimed is:
1. A power converter comprising:
input means for accepting a dc voltage source,
a power transformer including a primary winding and a secondary winding;

a resonating capacitor having first and second access terminals;

a first switch for applying the dc voltage source to the primary winding in a first direction;

a second switch for applying the dc voltage source to the primary winding in a second direction opposite the first direction;

a first secondary resonant circuit connected to a first terminal of the secondary winding and including, a first inductance derived in part from a leakage inductance of the transformer, a first rectifying diode and a connection to the first access terminal of the resonating capacitor;

a second secondary resonant circuit connected to a second terminal of the secondary winding and including a second inductance derived in part from a leakage inductance of the transformer, a second rectifying diode and a connection to said first access of the resonating capacitor;

the resonating capacitor having resonant operation with both the first and second resonant circuits; and output means connected to the resonating capacitor, having constant current sink characteristics and adapted for accepting a load to be energized.

2. A power converter as defined in claim 1 wherein the first and second switch connect a first node of the input means to opposite terminals of the primary winding respectively and a second node of the input means connected to a node of the primary winding intermediate the opposite terminals of the primary winding.

3. A power converter as defined in claim 1 wherein the first and second switch are connected in a series connection and the series connection being connected in parallel across the input means.

4. A power converter as defined in claim 1 where the first and second switches are connected in a bridge configuration with a third switch connected in the bridge configuration operating in accord with the first switch and a fourth switch connected in the bridge configuration operating in accord with the second switch.

5. A power converter as defined in claim 1 and further including regulation control circuitry, comprising:

means for sensing an output signal of the load means responsive to the means for sensing for generating an error signal responsive to a deviation of the output signal from a predetermined regulation value, and means for converting the error signal into a frequency, and means responsive to the frequency to generate a driver signal having a fixed interval value and a variable period, and means for alternately applying the drive signal to the first and second switches.

6. A power converter comprising inverting means for generating first and second voltage pulses in phase opposition to one another, output circuitry including signal shaping circuitry, filter circuitry and output terminals to accept a load, the signal shaping circuitry including first and second resonant circuits, resonant at a switching frequency of the inverting means, each resonant circuit including inductive impedance and a rectifying diode for limiting resonant flow through the inductive impedance to one direction of flow, a common resonant capacitor shared by the first and second resonant circuits and having one of its terminals connected to both the first and second circuits respectively.

7. A power converter as defined in claim 6 wherein the inventing means is embodied in a push-pull configuration.

8. A power conversion as directed in claim 6 wherein the inventing means is embodied in a half bridge configuration.

9. A power converter as defined in claim 6 wherein the inventing means is embodied in a full bridge configuration.

* * * * *